(12) United States Patent
Otsuka et al.

(10) Patent No.: US 10,340,771 B2
(45) Date of Patent: Jul. 2, 2019

(54) FAN MOTOR WITH HEAT SINK AND DISCHARGE SECTION

(71) Applicant: ASMO CO., LTD., Kosai, Shizuoka-pref. (JP)

(72) Inventors: Hikaru Otsuka, Kosai (JP); Yoshikazu Fujii, Toyohashi (JP); Akinori Hiroyama, Toyohashi (JP); Hideaki Ishii, Kosai (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 15/421,441

(22) Filed: Feb. 1, 2017

(65) Prior Publication Data

US 2017/0288507 A1 Oct. 5, 2017

(30) Foreign Application Priority Data

Mar. 31, 2016 (JP) .................. 2016-071838

(51) Int. Cl.
| | |
|---|---|
| *H02K 9/22* | (2006.01) |
| *H02K 9/06* | (2006.01) |
| *H02K 11/33* | (2016.01) |
| *H02K 5/20* | (2006.01) |
| *F04D 25/06* | (2006.01) |

(Continued)

(52) U.S. Cl.
CPC ............... *H02K 9/22* (2013.01); *F04D 25/06* (2013.01); *F04D 25/068* (2013.01); *F04D 25/0613* (2013.01); *F04D 25/082* (2013.01); *F04D 29/26* (2013.01); *F04D 29/4226* (2013.01); *F04D 29/5813* (2013.01); *H02K 5/18* (2013.01);

(Continued)

(58) Field of Classification Search
CPC . H02K 9/22; H02K 9/06; H02K 11/33; H02K 5/18; H02K 5/20; H02K 5/22; F04D 25/06; F04D 25/0613; F04D 25/068; F04D 29/26; F04D 29/4226; F04D 29/5813
USPC ..................................... 310/68 D, 68 R, 67 R
See application file for complete search history.

(56) References Cited

U.S. PATENT DOCUMENTS

2008/0179972 A1* 7/2008 Aoki ................... H02K 11/33
310/52

FOREIGN PATENT DOCUMENTS

| JP | 2002112504 A | * | 4/2002 | ............ H02K 11/33 |
| JP | 2015-57014 A | | 3/2015 | |
| JP | 2015057014 A | * | 3/2015 | ............... H02K 9/06 |

OTHER PUBLICATIONS

Machine translation of JP 2015-057014 A. (Year: 2015).*
Machine translation of JP 2002-112504 A. (Year: 2002).*

* cited by examiner

*Primary Examiner* — Michael Andrews
(74) *Attorney, Agent, or Firm* — SOLARIS Intellectual Property Group, PLLC

(57) ABSTRACT

A fan motor including: a motor body; a fan; a controller that includes a circuit board and a circuit element; a heat sink that is attached to the controller and that includes a heat dissipating section; a case body that includes a motor holder, and a center piece supporting the stator, with the heat dissipating section disposed between the center piece and the motor holder and the center piece forming an airflow passage along which airflow passes; an introduction section through which airflow flowing toward the heat dissipating section is introduced; a discharge section through which the airflow that has been introduced through the introduction section is dis- (Continued)

charged toward the fan side; and a facing section that is disposed at a downstream side of the airflow with respect to the heat dissipating section and that extends in a direction to obstruct the airflow.

8 Claims, 7 Drawing Sheets

(51) Int. Cl.
*F04D 25/08* (2006.01)
*F04D 29/26* (2006.01)
*H02K 5/18* (2006.01)
*H02K 5/22* (2006.01)
*F04D 29/42* (2006.01)
*F04D 29/58* (2006.01)

(52) U.S. Cl.
CPC .............. *H02K 5/20* (2013.01); *H02K 5/22* (2013.01); *H02K 9/06* (2013.01); *H02K 11/33* (2016.01)

FAN MOTOR WITH HEAT SINK AND DISCHARGE SECTION

CROSS-REFERENCE TO RELATED APPLICATION

This application is based on and claims priority under 35 USC 119 from Japanese Patent Application No. 2016-071838 filed on Mar. 31, 2016, the disclosure of which is incorporated by reference herein.

BACKGROUND

Technical Field

The present disclosure relates to a fan motor.

Related Art

Japanese Patent Application Laid-Open (JP-A) No. 2015-57014 describes a fan motor that rotates a blower fan. The fan motor is an outer rotor type brushless motor, and is configured including a motor body having a stator and a rotor, a motor holder provided at the periphery of the rotor, and a center piece that supports the stator.

A cooling air introduction path, which guides cooling air from the motor holder exterior toward the motor body side, is formed in the motor holder. The cooling air passing along the cooling air introduction path hits a heat sink, such that heat from circuit elements and so on configuring a part of a control circuit for controlling the passage of current to the stator is dissipated through the heat sink.

It is desirable to improve heat dissipation performance of heat from the control circuit through the heat sink, from the perspectives of stability of operation and durability of the fan motor.

SUMMARY

In consideration of the above circumstances, the present disclosure provides a fan motor capable of improving heat dissipation performance of a control circuit.

A fan motor of a first aspect of the present disclosure includes: a motor body including a stator and a rotor that rotates in response to a magnetic field of the stator; a fan that rotates accompanying rotation of the rotor; a controller that includes a circuit board configuring a control circuit to control passing of current to the stator and a circuit element attached to the circuit board; a heat sink that is attached to the controller and that includes a heat dissipating section for dissipating heat from the controller; a case body that includes a motor holder provided at the periphery of the rotor, and a center piece supporting the stator, with the heat dissipating section disposed between the center piece and the motor holder and the center piece forming an airflow passage along which airflow passes; an introduction section through which airflow flowing toward the heat dissipating section is introduced; a discharge section through which the airflow that has been introduced through the introduction section is discharged toward the fan side; and a facing section that is disposed at a downstream side of the airflow with respect to the heat dissipating section and that extends in a direction to obstruct the airflow.

In the fan motor of the first aspect of the present disclosure, the fan is rotated when the motor body is operated, namely, when the rotor rotates in response to the magnetic field of the stator. The fan thereby starts to blow air. Note that the passing of current to the stator is controlled by the controller, and the controller is configured including the circuit board and the circuit element. Heat from the circuit element and the circuit board is transmitted to the heat sink. Airflow that has passed through the introduction section and along the airflow passage and flows toward the discharge section hits the heat dissipating section of the heat sink, thereby enabling heat from the circuit element and the circuit board that has been transmitted to the heat sink to be dissipated into the airflow from the heat dissipating section of the heat sink. Note that the first aspect of the disclosure is provided with the facing section that extends in a direction to obstruct the airflow introduced through the introduction section. Thus, the airflow that has passed the heat dissipating section of the heat sink remains in the vicinity of the heat dissipating section of the heat sink due to hitting the facing section. This accordingly enables the heat dissipation performance from the heat dissipating section of the heat sink into the airflow to be improved. Thus, the first aspect of the present disclosure enables heat dissipation performance of the controller, namely, heat dissipation performance of the control circuit, to be improved.

A fan motor of a second aspect of the present disclosure is the fan motor of the first aspect, wherein the facing section is provided in a position close to the heat dissipating section.

In the fan motor of the second aspect of the present disclosure, the facing section is disposed in the above-described position, such that airflow that has hit the facing section can be even more readily made to remain in the vicinity of the heat dissipating section of the heat sink. This enables the heat dissipation performance of the control circuit to be still further improved.

A fan motor of a third aspect of the present disclosure is the fan motor of the first or the second aspect, wherein the facing section is formed in a protruding shape projecting out in a direction to narrow a flow path of the airflow.

In the fan motor of the third aspect of the present disclosure, the facing section is formed in a protruding shape projecting out in a direction to narrow the flow path of the airflow, thereby enabling the flow rate of airflow passing the heat dissipating section of the heat sink to be increased. This enables dissipation of heat from the heat dissipating section of the heat sink into the airflow to be promoted.

A fan motor of a fourth aspect of the present disclosure is the fan motor of any one of the first to the third aspects, wherein the facing section is provided on the discharge section side.

In the fan motor of the fourth aspect of the present disclosure, the facing section is provided on the discharge section side, thereby enabling the volume of the space in which the airflow remains to be increased. This enables the heat dissipation performance of the control circuit to be still further improved.

A fan motor of a fifth aspect of the present disclosure is the fan motor of the fourth aspect, wherein the airflow is discharged from the discharge section after flowing along the motor body.

The fan motor of the fifth aspect of the present disclosure enables the motor body to be cooled by the airflow introduced through the introduction section.

A fan motor of a sixth aspect of the present disclosure is the fan motor of any one of the first to the fifth aspects, wherein the heat dissipating section is configured including plural projections that project out toward the motor holder side, and a flow rate increasing section is provided to the case body so as to be disposed in a state disposed running along or contacting projection direction leading end side faces of the plural projections.

In the fan motor of the sixth aspect of the present disclosure, providing the flow rate increasing section to the case body enables the flow rate of airflow passing between the plural projections of the heat sink to be increased. This enables the dissipation of heat from the projections of the heat sink into the airflow to be promoted.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
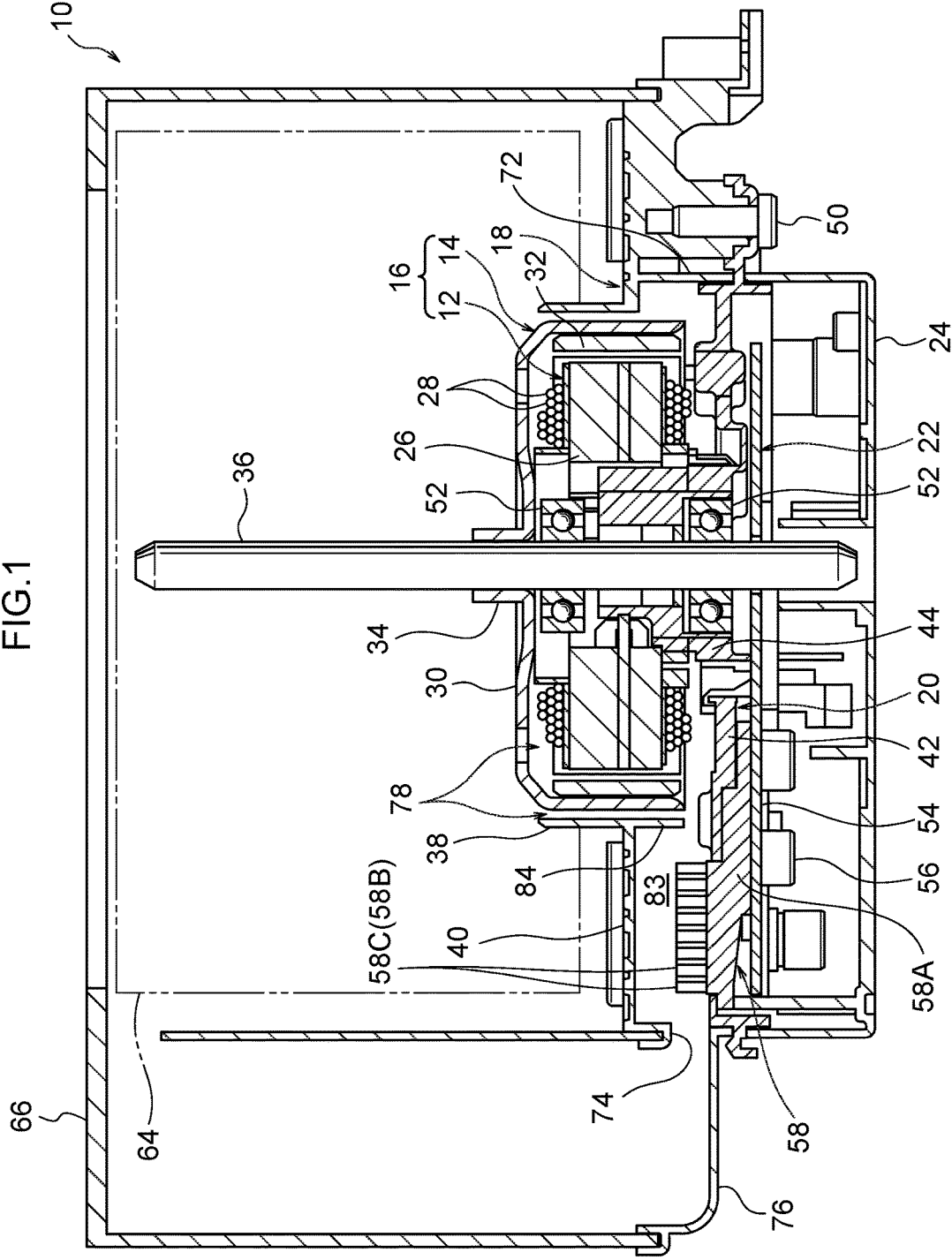
FIG. 1 is a vertical cross-section of a fan motor according to a first exemplary embodiment.
Figure 2:
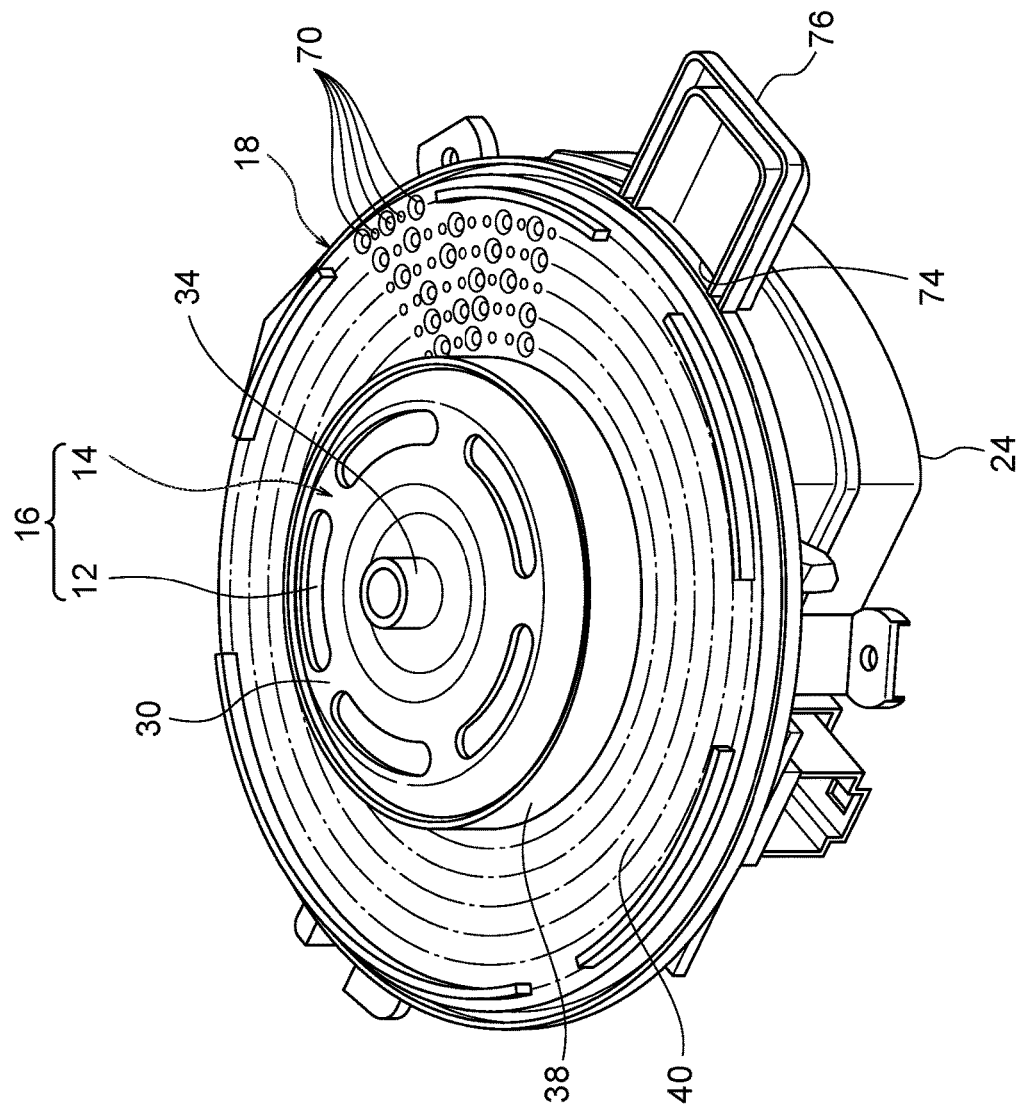
FIG. 2 is a perspective view illustrating a fan motor according to the first exemplary embodiment, with a duct, fan, and motor shaft omitted from illustration.
Figure 3:
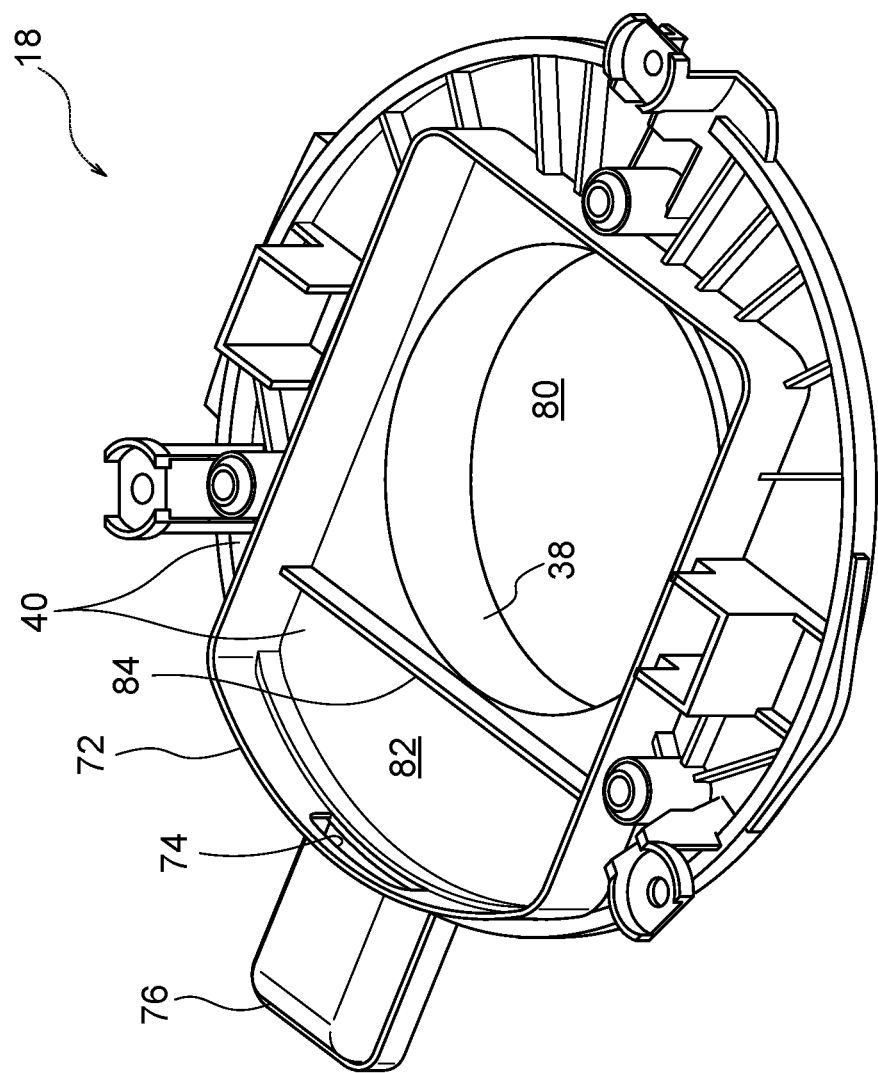
FIG. 3 is a perspective view of motor housing of a fan motor according to the first exemplary embodiment, as viewed from the side where a controller is disposed.

Explanation follows regarding a fan motor according to a first exemplary embodiment of the present disclosure, with reference to FIG. 1 to FIG. 3.

As illustrated in FIG. 1, a fan motor 10 according to the present exemplary embodiment includes a motor body 16 including a stator 12 and a rotor 14, a motor holder 18, a center piece 20, a controller 22, and a circuit case 24. Note that in the below explanation, unless specifically stated otherwise, simple reference to the axial direction, radial direction, and circumferential direction refers to the rotation axial direction, rotation radial direction, and rotation circumferential direction of the rotor 14.

The stator 12 includes a core 26 formed in a ring shape, and plural windings 28. The plural windings 28 are wound about plural teeth formed in a radiating shape to the core 26, with an insulator made of resin interposed therebetween.

The rotor 14 includes bottomed, circular tube shaped rotor housing 30, and rotor magnets 32 fixed to an inner circumferential face of the rotor housing 30. The rotor housing 30 houses the stator 12, and the rotor magnets 32 are disposed facing the stator 12 at the radial direction outside of the stator 12. A circular tube shaped fixing portion 34 is formed in the center of a ceiling portion of the rotor housing 30, and a motor shaft 36 is press-fit inside the fixing portion 34.

As illustrated in FIG. 1 and FIG. 2, the motor holder 18 configuring part of a case body is provided at the periphery of the rotor 14. Specifically, the motor holder 18 includes an enclosing section 38 formed in a tube shape surrounding the periphery of the rotor 14, and a circular disk section 40 extending toward the radial direction outside of the enclosing section 38 from the enclosing section 38. The circular disk section 40 is formed in a thin container shape open at a body section 42 side of the center piece 20, described later. Plural cut-out cavities 70 are formed about the circumferential direction of the circular disk section 40 on the side of the circular disk section 40 where a fan 64 is disposed.

As illustrated in FIG. 3, a rectangular shaped wall section 72, formed in a substantially rectangular shape in an axial direction view, projects out toward the center piece 20 side, described later, on the opposite side of the motor holder 18 to the side where the fan 64 (see FIG. 1) is disposed. A rectangular shaped introduction hole 74, serving as an introduction section for introducing airflow into the rectangular shaped wall section 72, is formed in a radial direction outside portion of the rectangular shaped wall section 72. Note that a guide section 76 for guiding airflow into the introduction hole 74 is formed at the radial direction outside of the location of the rectangular shaped wall section 72 where the introduction hole 74 is formed. As illustrated in FIG. 1 and FIG. 3, a gap formed between the rotor 14 and the stator 12, and an opening formed in the rotor, configure discharge sections 78 for discharging airflow that has been introduced into the rectangular shaped wall section 72. Note that a gap formed between the enclosing section 38 and the motor body 16 also configures a discharge section 78 for discharging airflow that has been introduced into the rectangular shaped wall section 72.

As illustrated in FIG. 3, in a space surrounded by the rectangular shaped wall section 72, the portion of the space facing the enclosing section 38 (this being a portion having a side in communication with space at the radial direction inside of the enclosing section 38) configures a motor body placement section 80 where the motor body 16 is disposed. In the space surrounded by the rectangular shaped wall section 72, the portion of the space further toward the introduction hole 74 side than the motor body placement section 80, and that is a portion facing the circular disk section 40 in the axial direction, configures a heat dissipating section placement section 82 where a heat dissipating section 58B of a heat sink 58, described later, is disposed. A facing wall 84, serving as a facing section formed in a plate shape with its thickness direction in the radial direction, protrudes out toward the center piece 20 side, described later, at a boundary of the circular disk section 40 between the motor body placement section 80 and the heat dissipating section placement section 82.

As illustrated in FIG. 1, the center piece 20 configuring another part of the case body includes the body section 42 that is assembled to the circular disk section 40 in the axial direction of the motor body 16, and a support section 44 that projects out from the center of the body section 42. A peripheral edge of the body section 42 engages with a peripheral edge of the motor holder 18. An airflow passage 83, along which airflow passes flowing from the introduction hole 74 to the discharge sections 78, is thereby formed between the motor holder 18 and the center piece 20. Note that, in a state assembled in the axial direction of the motor body 16, the body section 42 of the center piece 20 and the circular disk section 40 of the motor holder 18 are fixed together by bolts 50 at several locations about the circumferential direction of the motor body 16.

The annular shaped core 26 is press-fit into the support section 44 formed at the center of the body section 42. The stator 12 is thereby retained by the center piece 20.

Shaft bearings 52 are respectively provided to the support section 44 provided to the center piece 20, and the motor shaft 36 is press-fit inside the shaft bearings 52. Due to the motor shaft 36 being supported by the support section 44 with the shaft bearings 52 interposed therebetween in this manner, the entire rotor 14 including the motor shaft 36 is capable of rotating with respect to the center piece 20 and the stator 12.

The controller 22 is disposed at the opposite side of the body section 42 of the center piece 20 to the stator 12. The controller 22 includes a rectangular plate shaped circuit board 54 disposed along the body section 42 of the center piece 20, and plural circuit elements 56 and the like packaged on (attached to) the circuit board 54.

The heat sink 58, which is formed using a metal such as aluminum or copper, a resin material, or the like with good thermal conductivity, is attached to a face on the body section 42 side of the circuit board 54. The heat sink 58 is configured including a base 58A formed in a substantially rectangular shape as viewed from the plate thickness direction of the circuit board 54, and plural bosses 58C serving as projections configuring the heat dissipating section 58B that protrudes out at a portion on one short direction side of the base 58A and that dissipates a large part of the heat transmitted to the heat sink 58. The plural bosses 58C pierce through the body section 42 of the center piece 20 and are exposed on the circular disk section 40 side of the motor holder 18, so as to be disposed further toward an upstream side (the introduction hole 74 side) than the facing wall 84 inside the airflow passage 83. Leading end portions of the plural bosses 58C and the facing wall 84 are disposed facing each other in the radial direction.

The circuit case 24 is formed in a flat container shape and is assembled to the body section 42 in a state in which its opening faces toward the body section 42 side of the center piece 20. The above-described controller 22 is accordingly housed in a space formed by the circuit case 24 and the body section 42.

Note that the fan motor 10 is suitably employed as a blower installed in a vehicle such as a passenger vehicle. The fan 64 (such as a Sirocco fan) is attached to a leading end portion of the motor shaft 36, and the motor holder 18 is assembled to a duct 66 housing the fan 64.

Operation and Advantageous Effects of Present Exemplary Embodiment

Explanation follows regarding operation and advantageous effects of the present exemplary embodiment.

As illustrated in FIG. 1, in the fan motor 10 according to the present exemplary embodiment explained above, the introduction hole 74 is formed in the motor holder 18. When there is a vacuum inside the fan motor 10 accompanying rotation of the fan 64 illustrated in FIG. 1, air is sucked in through the introduction hole 74, and airflow that has been introduced through the introduction hole 74 is guided along the airflow passage 83 toward the motor body 16 side. The airflow that has been guided toward the motor body 16 side is discharged toward the fan 64 side from the discharge sections 78, these being gaps formed between the enclosing section 38 of the motor holder 18 and the motor body 16. This enables the motor body 16, and the stator 12 in particular, to be cooled.

The plural bosses 58C of the heat sink 58 are disposed in the airflow passage 83. Thus, some of the airflow passing along the airflow passage 83 passes between the bosses 58C. This enables heat from the circuit elements 56 and the circuit board 54 transmitted to the heat sink 58 to be dissipated into the airflow from the plural bosses 58C of the heat sink 58.

In the present exemplary embodiment, the facing wall 84 that extends in a direction obstructing the airflow introduced through the introduction hole 74 is provided at a downstream side (the discharge section 78 side) of the plural bosses 58C of the heat sink 58. Thus, airflow that has passed through the plural bosses 58C of the heat sink 58 remains in the vicinity of the plural bosses 58C of the heat sink 58 due to hitting the facing wall 84. Convection is accordingly generated in the vicinity of the plural bosses 58C of the heat sink 58, enabling heat dissipation performance from the plural bosses 58C of the heat sink 58 to the airflow to be improved. Thus, the present exemplary embodiment enables the heat dissipation performance of the controller 22, namely, the heat dissipation performance of the circuit elements 56 and the circuit board 54 configuring a control circuit, to be improved.

By making the facing wall 84 closer to the plural bosses 58C of the heat sink 58, airflow that has hit the facing wall 84 can be even more readily made to remain in the vicinity of the plural bosses 58C of the heat sink 58. This enables the heat dissipation performance of the circuit elements 56 and the circuit board 54 configuring the control circuit to be still further improved. Note that the distance between the facing wall 84 and the plural bosses 58C of the heat sink 58 may be set as appropriate in consideration of the demanded cooling performance and so on.

In the present exemplary embodiment, the facing wall 84 is formed in shape protruding out from the motor holder 18 toward the center piece 20 side, such that the flow area becomes narrower at part of the airflow passage 83 along which the airflow passes. Thus, the flow rate of the airflow introduced through the introduction hole 74 increases on progression toward the part of the airflow passage 83 where the facing wall 84 is provided. The flow rate of the airflow passing between the plural bosses 58C of the heat sink 58 increases as a result, enabling dissipation of heat from the plural bosses 58C of the heat sink 58 into the airflow to be promoted.

Note that making the facing section abut or be disposed close to leading end side faces in the projection direction of the plural bosses 58C of the heat sink 58 enables the airflow to be guided between the plural bosses 58C. This enables dissipation of heat from the plural bosses 58C of the heat sink 58 into the airflow to be promoted.

In the present exemplary embodiment, the facing wall 84 is disposed on the side of the space (the heat dissipating section placement section 82) where the motor body 16 is disposed, namely, is disposed on the discharge section 78 side, inside the airflow passage 83. This enables the volume of the space in which the airflow remains in the vicinity of the plural bosses 58C of the heat sink 58 to be increased. This enables the heat dissipation performance of the circuit elements 56 and the circuit board 54 configuring the control circuit to be still further improved.

Second Exemplary Embodiment

Figure 4:
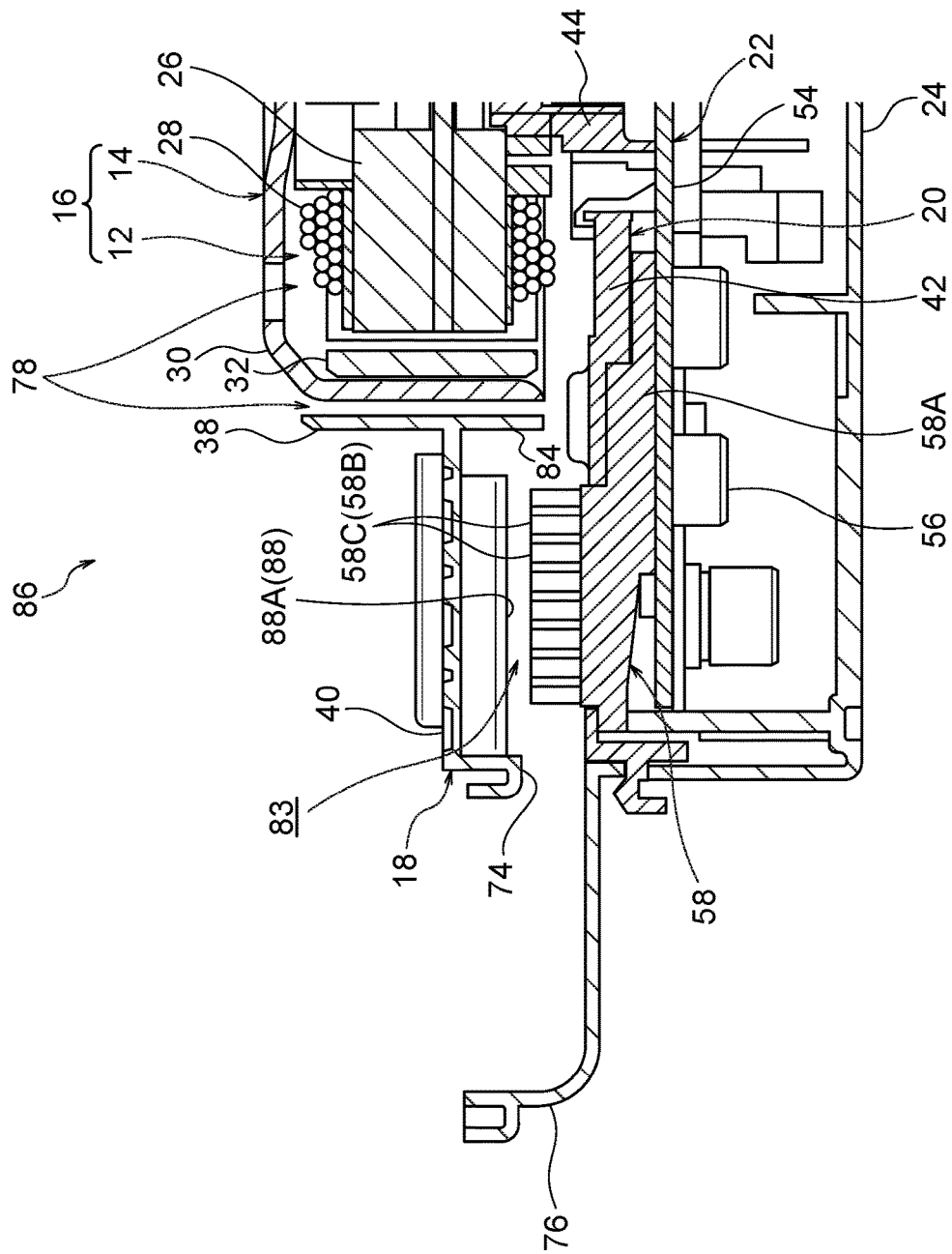
FIG. 4 is an enlarged vertical cross-section illustrating part of a fan motor according to a second exemplary embodiment.
Figure 5:
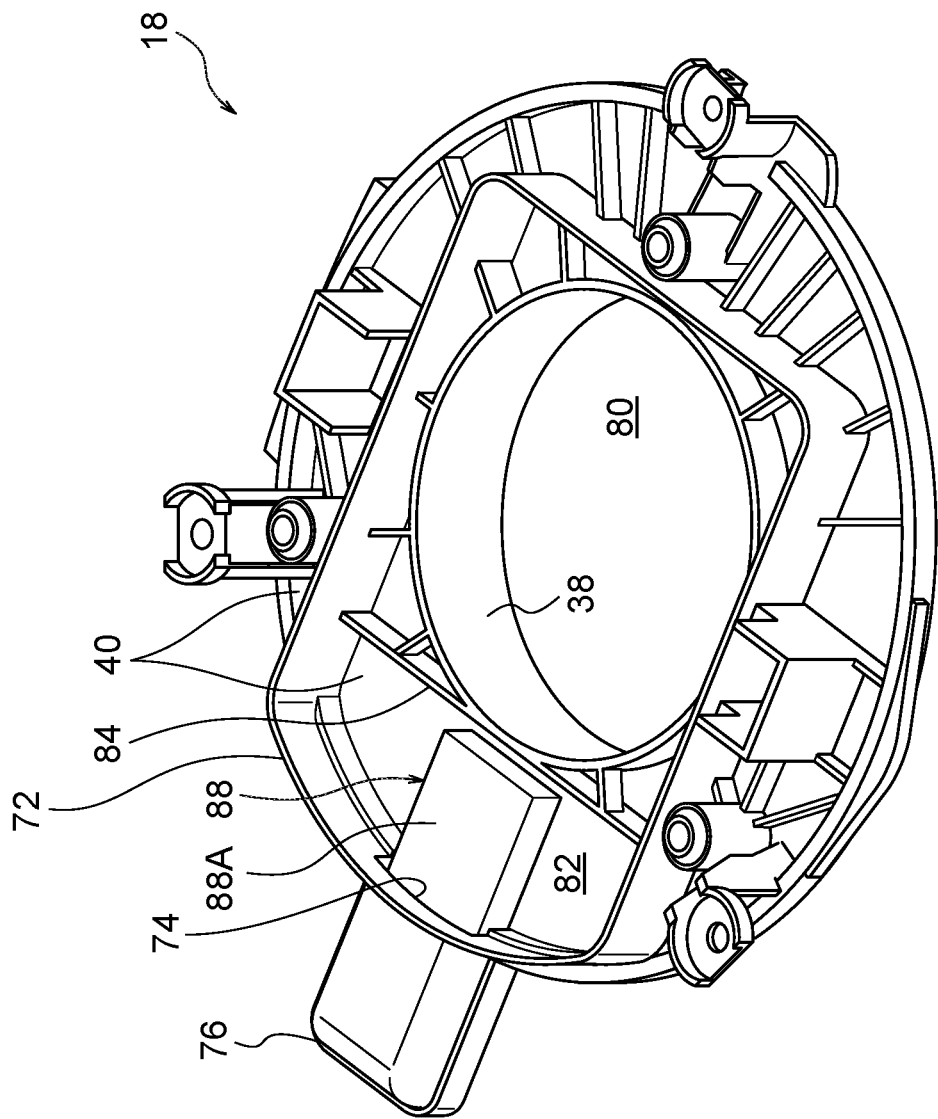
FIG. 5 is a perspective view of motor housing of a fan motor according to the second exemplary embodiment, as viewed from the side where a controller is disposed.
Figure 6:
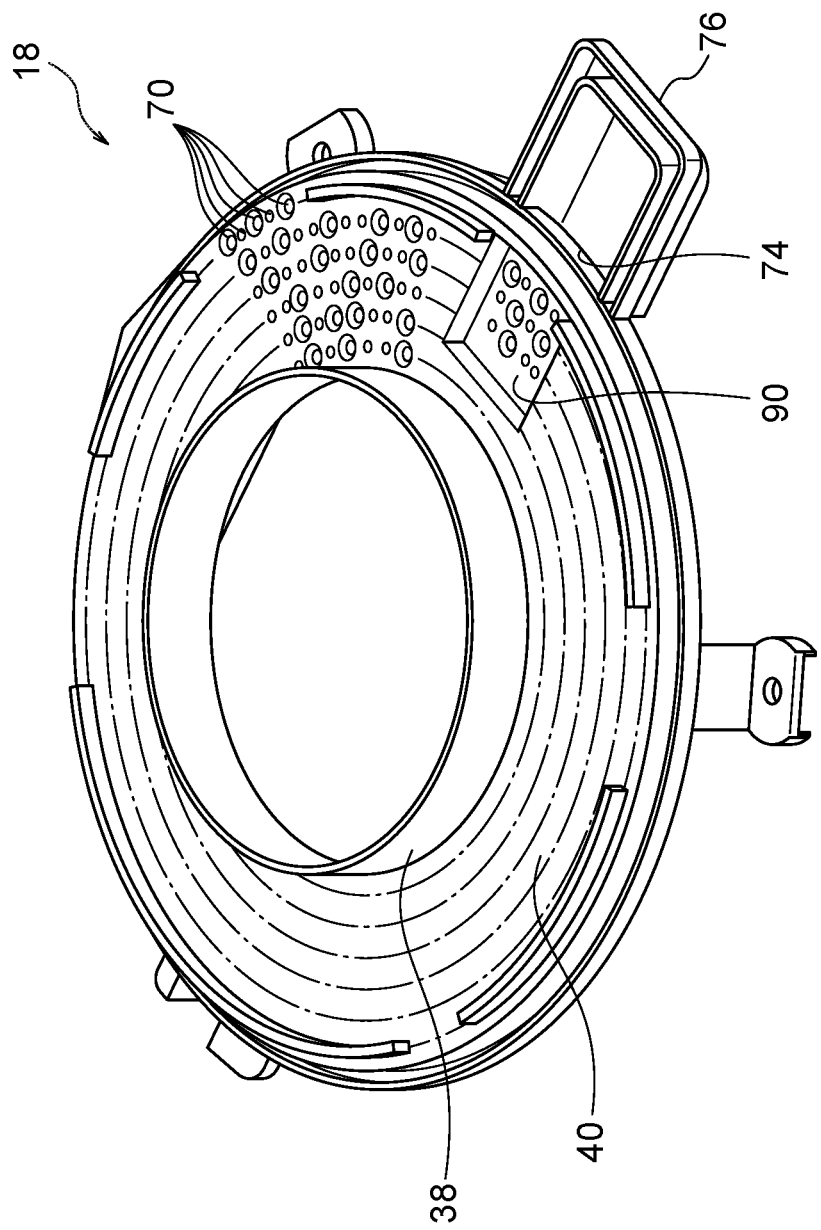
FIG. 6 is a perspective view of motor housing of a fan motor according to the second exemplary embodiment, as viewed from the side where a fan is disposed.

Explanation follows regarding a fan motor according to a second exemplary embodiment of the present disclosure, with reference to FIG. 4 to FIG. 6. Note that members and sections corresponding to the above-described fan motor 10 according to the first exemplary embodiment are appended with the same reference numerals as those of the fan motor 10, and explanation thereof is sometimes omitted.

As illustrated in FIG. 4 and FIG. 5, a fan motor 86 according to the present exemplary embodiment has a feature that a flow rate increasing protrusion 88, serving as a flow rate increasing section projecting out toward the side of the plural bosses 58C of the heat sink 58, is formed on the circular disk section 40 of the motor holder 18. As illustrated in FIG. 5, the flow rate increasing protrusion 88 is formed in a substantially rectangular block shape (rectangular bodied shape) as viewed from the heat sink 58 side, and a face 88A on the heat sink 58 side of the flow rate increasing protrusion 88 is formed in a planar face shape extending along the radial direction and the circumferential direction. The face 88A on the heat sink 58 side of the flow rate increasing protrusion 88 is disposed close to the plural bosses 58C of the heat sink 58. Note that the face 88A on the heat sink 58 side of the flow rate increasing protrusion 88 may be made to abut the plural bosses 58C of the heat sink 58.

Figure 7:
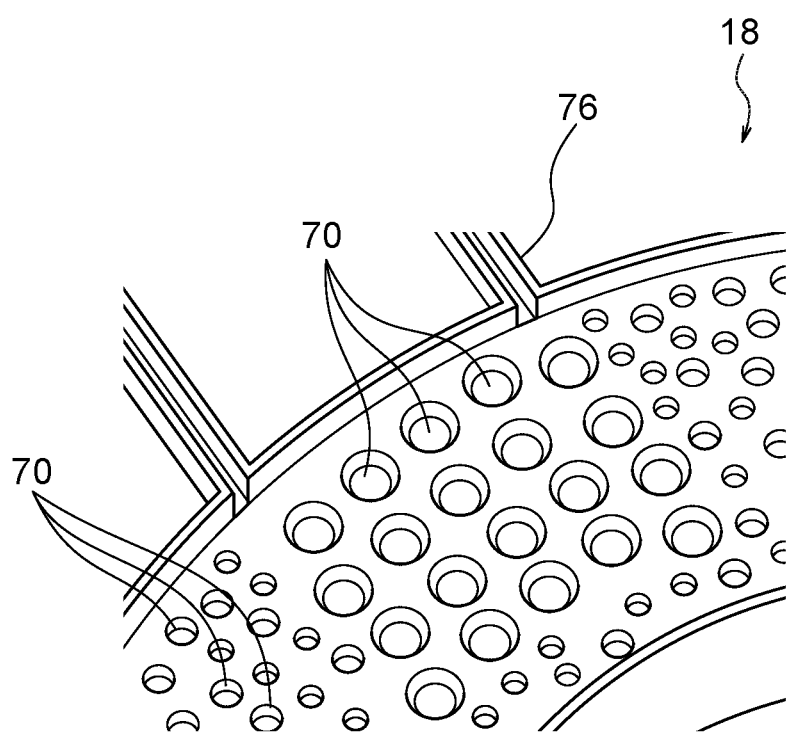
FIG. 7 is an enlarged perspective view of motor housing according to a modified example, as viewed from the side where a fan is disposed.

As illustrated in FIG. 6, an indentation 90 is formed on the opposite side of the circular disk section 40 of the motor holder 18 to the location where the flow rate increasing protrusion 88 is formed. This enables shrinkage when the motor holder 18 is formed by injection molding, casting, or the like to be suppressed. Note that, as illustrated in FIG. 7, shrinkage when forming the motor holder 18 may be suppressed without providing the indentation 90, by a means such as increasing the size of the cut-out cavities 70 formed in the portion on the opposite side of the circular disk section 40 of the motor holder 18 to the location where the flow rate increasing protrusion 88 is formed.

In the fan motor 86 explained above, the face 88A on the heat sink 58 side of the flow rate increasing protrusion 88 of the motor holder 18 is disposed close to the plural bosses 58C of the heat sink 58. This enables the amount of airflow in the airflow passage 83 slipping through between the plural bosses 58C of the heat sink 58 and the motor holder 18 to be reduced, and enables the flow rate of the airflow flowing between the plural bosses 58C of the heat sink 58 to be increased. This enables dissipation of heat from the plural bosses 58C of the heat sink 58 to the airflow to be promoted.

Note that in the fan motor 86 according to the second exemplary embodiment, an example has been explained in which the flow rate of the airflow flowing between the plural bosses 58C of the heat sink 58 is increased by providing the flow rate increasing protrusion 88; however, the present disclosure is not limited thereto. For example, the flow rate of the airflow flowing between the plural bosses 58C of the heat sink 58 may be increased by extending a flow rate increasing wall, serving as a flow rate increasing section projecting out from a peripheral edge of the introduction hole 74 of the rectangular shaped wall section 72 of the motor holder 18 toward the motor body 16 side, and causing a face on the heat sink 58 side of the flow rate increasing wall to be disposed close to, or to abut, the plural bosses 58C of the heat sink 58.

In the fan motors 10, 86 according to the first exemplary embodiment and the second exemplary embodiment, an example has been explained in which the facing wall 84 is disposed in the airflow passage 83 on the side of the space (the heat dissipating section placement section 82) where the motor body 16 is disposed; however, the present disclosure is not limited thereto. Placement of the facing wall 84 may be set as appropriate in consideration of the demanded cooling performance of the controller 22 and so on. Moreover, a discharge section from which airflow is discharged may be provided at a position where airflow introduced through the introduction hole 74 does not flow past the motor body 16 side.

Exemplary embodiments of the present disclosure have been explained above; however, the present disclosure is not limited to the above description, and obviously various other modifications may be implemented within a range not departing from the spirit of the present disclosure.

What is claimed is:

1. A fan motor comprising:
    a motor body including a stator and a rotor that rotates in response to a magnetic field of the stator;
    a fan that rotates accompanying rotation of the rotor;
    a controller that includes a circuit board configuring a control circuit to control passing of current to the stator and a circuit element attached to the circuit board;
    a heat sink that is attached to the controller and that includes a heat dissipating section for dissipating heat from the controller, the heat dissipating section including at least a projection configuring the heat dissipating section;
    a case body that includes a motor holder provided at a periphery of the rotor, and a center piece supporting the stator, with the heat dissipating section disposed between the center piece and the motor holder and the center piece forming an airflow passage along which airflow passes;
    an introduction section through which airflow flowing toward the heat dissipating section is introduced;
    a discharge section through which the airflow that has been introduced through the introduction section is discharged toward the fan side; and
    a facing wall that is disposed at a downstream side of the airflow passing through the projection with respect to the heat dissipating section, that extends in a direction to obstruct the airflow, and that extends along an axial direction of the motor,
    wherein the projection and the facing wall are disposed facing each other in a radial direction of the motor.

2. The fan motor of claim 1, wherein the facing wall is provided in a position close to the heat dissipating section.

3. The fan motor of claim 1, wherein the facing wall is formed in a protruding shape projecting out in a direction to narrow a flow path of the airflow.

4. The fan motor of claim 1, wherein the facing wall is provided on the discharge section side.

5. The fan motor of claim 4, wherein the airflow is discharged from the discharge section after flowing along the motor body.

6. The fan motor of claim 1, wherein:
    the heat dissipating section is configured including a plurality of projections that project out toward the motor holder side; and
    a flow rate increasing section is provided to the case body so as to be disposed in a state disposed running along projection direction leading end side faces of the plurality of projections.

7. The fan motor of claim 6, wherein the flow rate increasing section is formed on the motor holder in a substantially rectangular block shape as viewed from the heat sink side.

8. The fan motor of claim 7, wherein:
    a face on the heat sink side of the flow rate increasing section is formed in a planar face shape extending along a radial direction and a circumferential direction of the motor holder; and
    the face on the heat sink side of the flow rate increasing section is disposed close to the plurality of projections of the heat sink.

* * * * *